Sept. 19, 1939.　　　W. C. EDWARDS, JR　　　2,173,605
ROTARY HARVESTER-THRESHER
Original Filed Jan. 2, 1931　　4 Sheets-Sheet 1
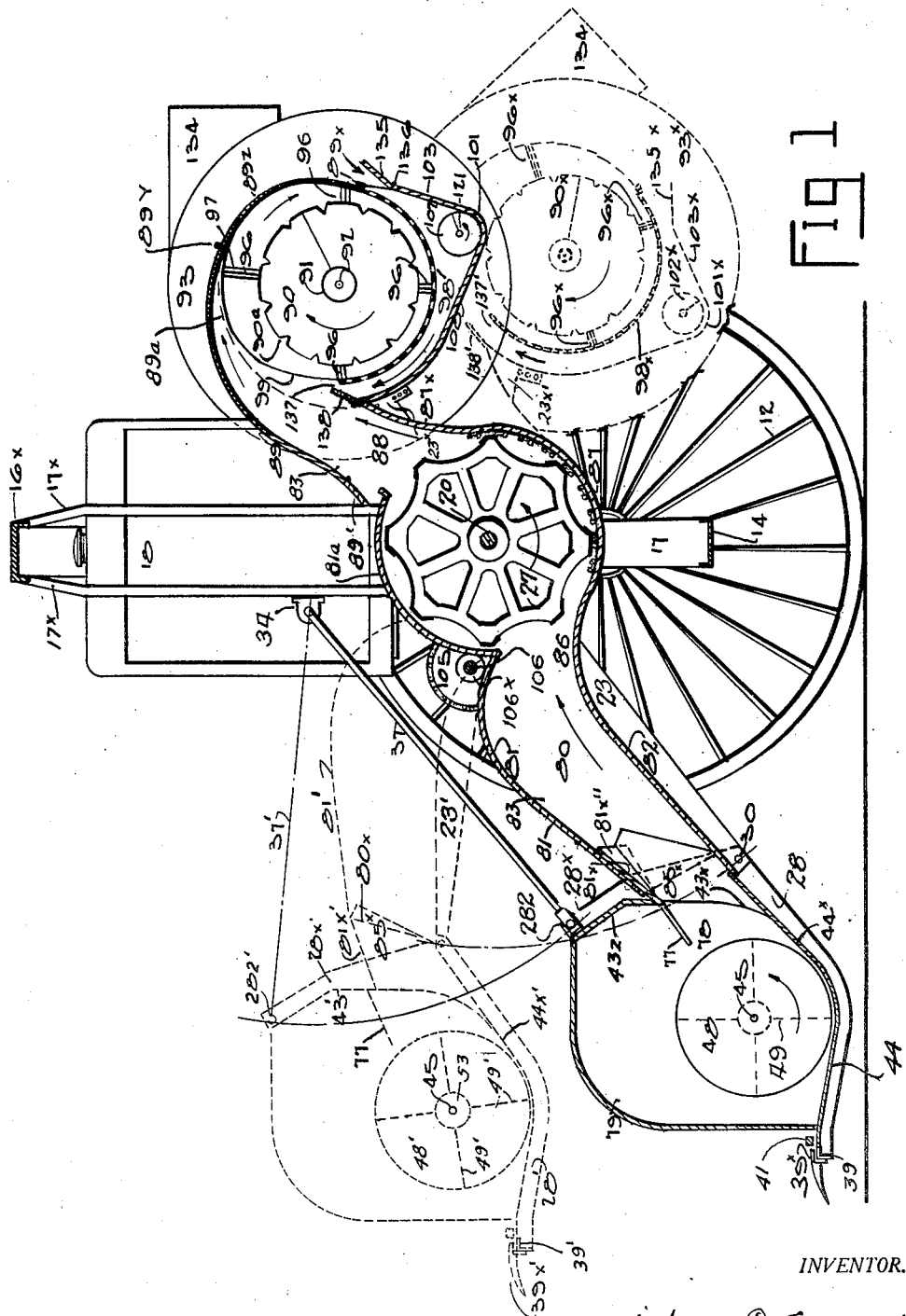
INVENTOR.
William C. Edwards Jr.

Sept. 19, 1939.  W. C. EDWARDS, JR  2,173,605
ROTARY HARVESTER-THRESHER
Original Filed Jan. 2, 1931  4 Sheets-Sheet 2
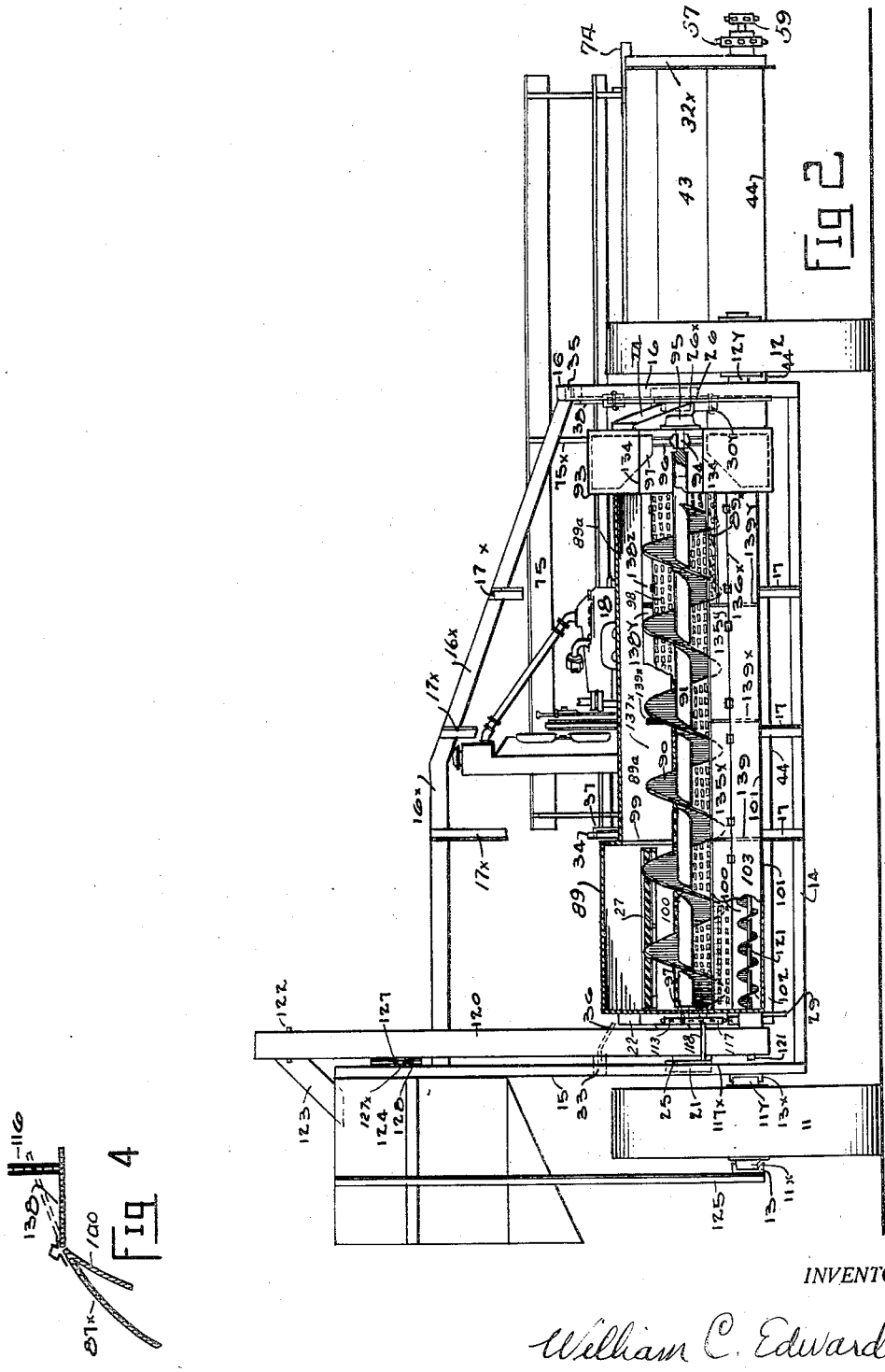
INVENTOR.
William C. Edwards Jr.

Sept. 19, 1939. W. C. EDWARDS, JR 2,173,605
ROTARY HARVESTER-THRESHER
Original Filed Jan. 2, 1931 4 Sheets—Sheet 3
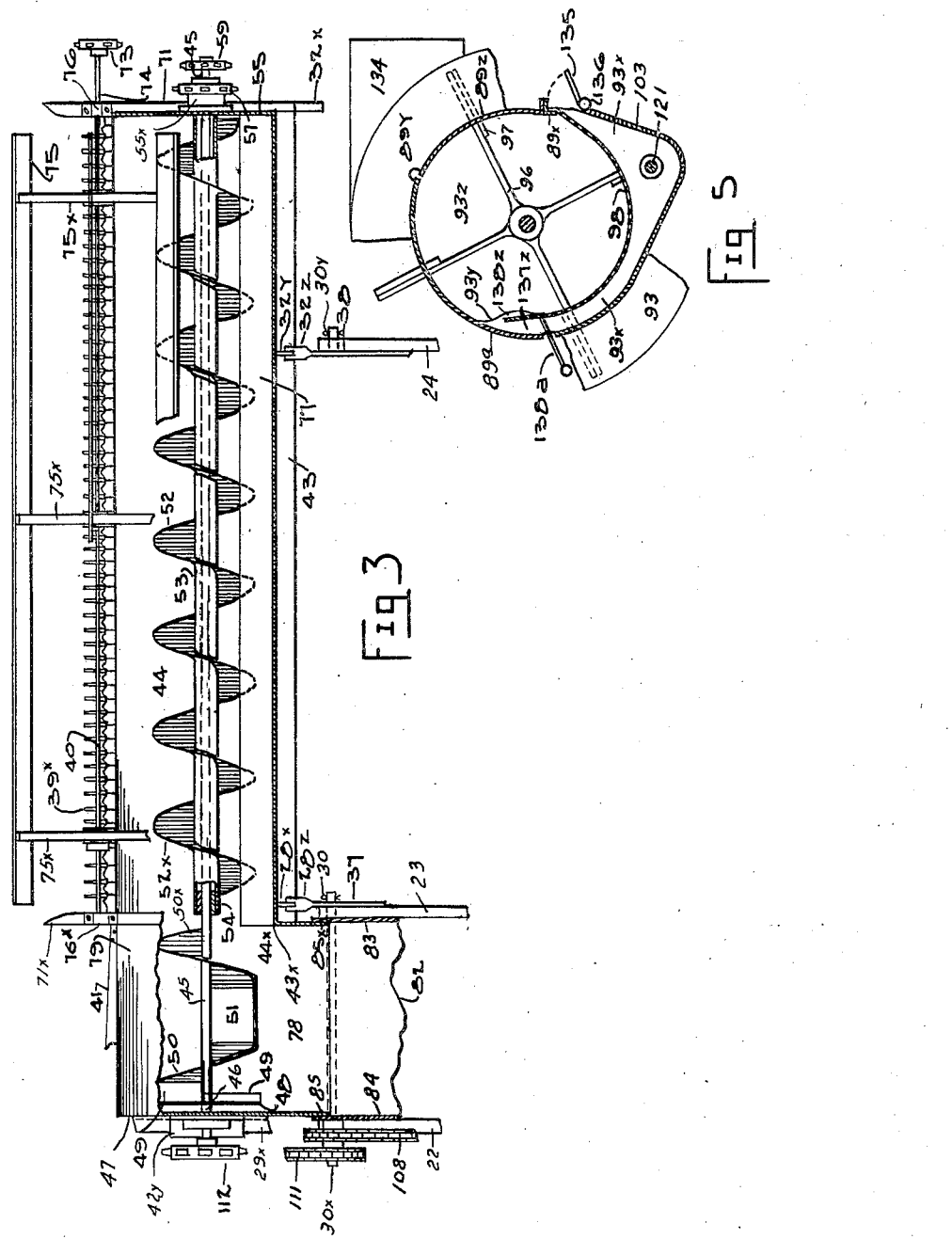
INVENTOR.
William C. Edwards Jr Sept. 19, 1939.   W. C. EDWARDS, JR   2,173,605
ROTARY HARVESTER-THRESHER
Original Filed Jan. 2, 1931   4 Sheets-Sheet 4
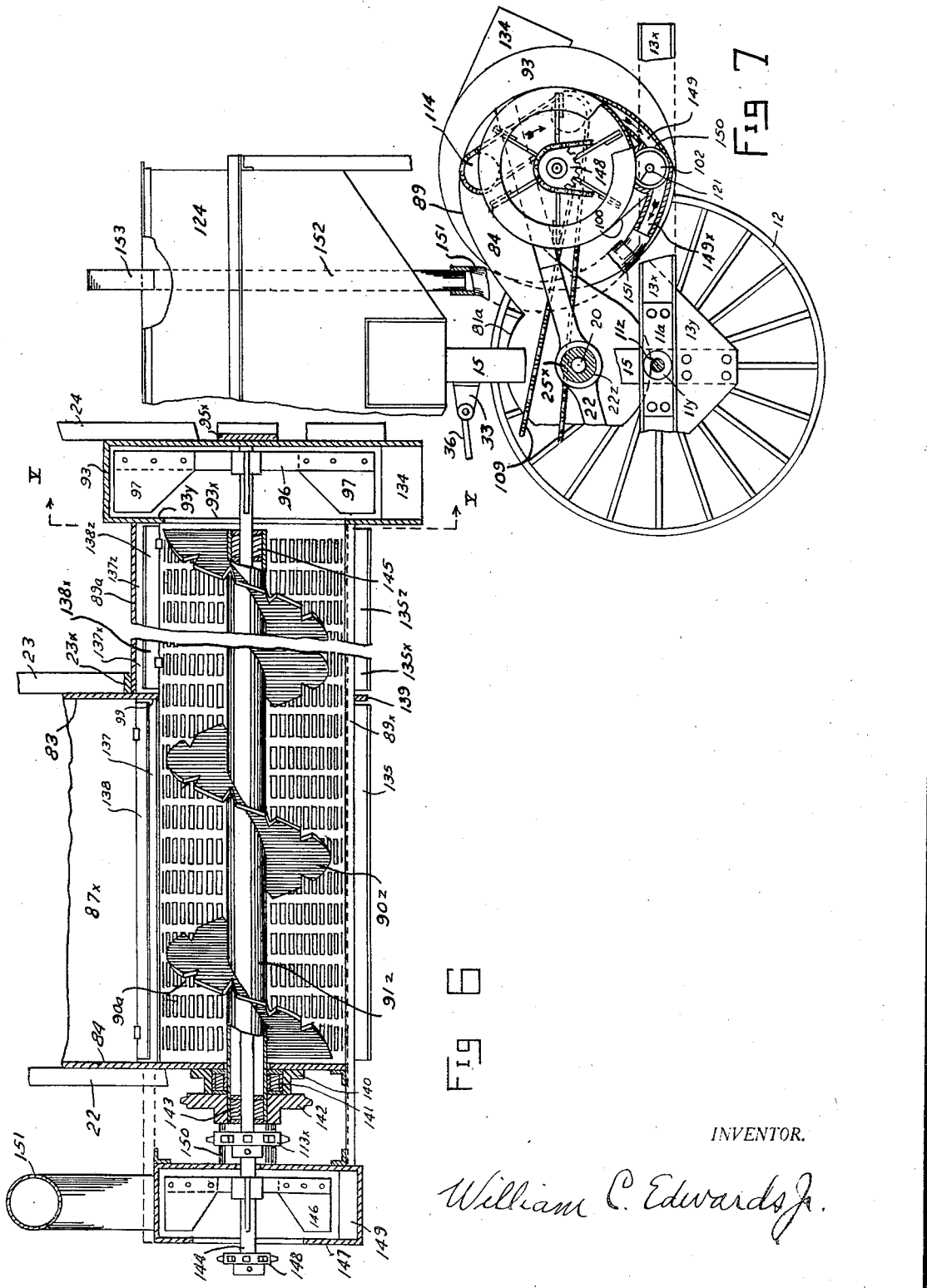
INVENTOR.
William C. Edwards Jr.

Patented Sept. 19, 1939

2,173,605

UNITED STATES PATENT OFFICE 2,173,605

ROTARY HARVESTER-THRESHER

William C. Edwards, Jr., Kansas City, Mo.; Josephine S. Edwards, executrix of said William C. Edwards, Jr., deceased, assignor to Josephine S. Edwards, Merriam, Kans.

Application January 2, 1931, Serial No. 506,211
Renewed September 25, 1935

10 Claims. (Cl. 130—27)

The invention relates to an improvement in thresher and separator mechanisms and the use of air in combination with elements of the device for overcoming backfeeding and congestion. The invention relates particularly to auger-type harvester threshers. Among the principal objects of the invention are:

1. The employment of a blower-fan feeding mechanism, forward of a threshing chamber and threshing mechanism, for receiving and transferring crops in an air blast to the threshing chamber and for thence upwardly and rearwardly diverting and subsequently downwardly deflecting the scouring air and crop discharge upon moving elements of a thresher-separator combination.

2. The employment of a blower fan mechanism and a suction fan mechanism in combination for creating a movement of air that will augment and assist mechanical transportation of crops to the threshing chamber, thence to and through the separator.

In the drawings, Fig. 1 represents a sectional view of the rotary harvester-thresher or combine, taken from front to rear of the machine with the end wall 84 removed. Fig. 2 shows a rear view of the machine, with parts in section to disclose internal mechanisms adjacent the separator portion. Fig. 3 shows a plan view of the forward or harvester portion of the machine, with the roof of the feeding chamber broken away to disclose the fan impeller in its air and crop receiving relation to the harvesting mechanism and its delivery outlet to the threshing chamber. Fig. 4 shows a valve mechanism. Fig. 5 shows a sectional and detail view as taken along the line V—V in Fig. 6. Fig. 6 shows a top view of an alternate separator and grain transfer means to that shown in Fig. 2. Fig. 7 represents a side view of the mechanism seen in Fig. 6. Similar numerals of reference indicate corresponding parts throughout all the figures of the drawings.

Referring to the drawings; main frame members 13 and 13x, Fig. 2 lead forwardly and may be supported by a front truck assembly, not shown, or may be attached to a tractor in the event a power take off is used in lieu of the customary motor for operating the mechanisms in my harvester-thresher. At 15 is a vertical channel rigidly bolted to the frame member 13x and preferably braced by the gusset 13y. A horizontal frame member such as 14 Fig. 2 and an upper frame member such as 16x are rigid to the member 15 and to the post 16. The post 16 may carry a block and spindle 12y arranged within the hub of the grain wheel 12. Blocks 11x and 11y rigid to the members 13 and 13x support an axle for the main wheel 11. Other bracing, such for instance as 17 and 17x may be used to stiffen the frame and separator section later described. The motor 18 customarily employed in harvester-threshers may be carried on the main frame members 13 and 13x, or mounted intermediate the wheels 11 and 12 as shown in Fig. 2 with the crank shaft in axial alignment with the cylinder shaft 20 of the thresher; or, a power take off may deliver power direct from the tractor, if so desired.

The harvester platform and feeding chamber is built as a unit frame structure having curved base elements such as 28 and 32x, a forward element 39 and other associated parts supporting the pan 44 and backwall 43, such as 28x, 29x and 32y. The sickle, which may be actuated by a pitman 41, runs in the guards 39x in the well understood manner. The harvester platform is supported from the main frame by beams, such as 22, 23 and 24 formed as at 22z to pivot on blocks such as 25 and 26 rigid on the frame, as for instance the block 25x bearing carried by the member 15, Fig. 7. The beams 22, 23 and 24 may be rigidly attached to the frame elements 29x, 28 and 32y, or be flexibly coupled therewith as at 30x, 30 and 30y. The beams 22, 23 and 24 pivot in unison, being raised and lowered by means not shown, to present the sickle 40 at the proper cutting elevation. Tie rods 36, 37 and 38 pivot at 33, 34 and 35 on the frame and to the elements 29x, 28 and 32y, as indicated at 28z and 32z, or may be otherwise arranged as desired. Springs or weighted beams may be used to counterbalance the harvester platform; or, if desired, the beams 22, 23 and 24 may extend rearwardly to carry the separator and employ its weight for counterbalance purposes. The cylinder shaft 20 of the threshing cylinder 27 rotates in bearings 21. The threshing chamber 86 is arranged immediately in rear of the fan blower-feeding mechanism 49—51, being supported by the pivotable beams 22 and 23; this secures a direct crop and air receiving relationship of the threshing passage to the fan-feeding chamber and its allied mechanisms. The bearings 21, if desired, may be positioned in axial alignment with the pivots 22z, if the separator section is used for counterbalance purposes. The rasp bar type of threshing cylinder is shown, though the spike tooth type of cylinder may be employed if desired.

The main shaft 45 of the harvester rotates in the bearing 46 in the case 42y adjacent the end wall 47 of the feeding chamber covered by the roof element 79, Fig. 3. Power may be taken off of the shaft 45 for actuating a pitman 41, if so desired. The shaft 45 extends longitudinally of the pan 44 with its outer end journaled in a bearing adjacent the outer end wall 55 of the harvester platform. Adjacent the wall 47, a circular disc 48, Fig. 3, is affixed to the shaft 45 and rigidly attached to the disc 48 may be seen fan blades or impellers 49, from one of which extends a spiral element 50 attached to the shaft 45, which may be offset at 51 as a fan blade. Beyond the fan blade 51, the spiral member 50 continues and terminates in a screw end 50x about where the open harvester pan 44 merges into the pan 44x under the roof 79 of the feeding chamber. Behind the sickle and operating above the pan 44 is shown a spiral conveyor 52 rigidly affixed to a tubular element 53 journaled in the bearing 54 sleeved on the shaft 45 near the screw end 50x. The opposite end of the element 53 is journaled in the bearing carried in the box 55x supported at the end wall 55 and carries a sprocket 57. The outer end of the shaft 45 rotates in a bearing within the tube 53 and carries a sprocket 59 from which power is transmitted through chain, sprocket and jack shaft means, not shown, to drive the reel sprocket 73 and also to cause the sprocket 57 to rotate the spiral conveyor 52 slower than the fan-impeller 49—50—51, but at the necessary revolutions per minute to properly receive and convey harvested elements, severed by the sickle, longitudinally along the pan 44 and in the space under the baffle plate 77 towards the feeding chamber 79, without congesting the pan 44 in rear of the sickle 40. The harvested crop is discharged against the faster rotating screw end 50x and under the air suction created by the fan elements 49—51 acting within the enclosed feeding chamber 79, is driven and blasted evenly through the outlet 80 to properly feed the threshing cylinder 27. It should be understood that the fan feeding chamber comprising the pan section 44x, closed end wall 47 and roof cover 79 permits air to rush in with the crop at the point where the open pan section merges with the covered pan 44x section.

The driven reel sprocket 73 drives the reel shaft 74, if used; the reel shaft rotates in bearings 76 and 76x carried by the frame supports 71 and 71x, Fig. 3. Reel arms 75x affixed to spiders 75y on the shaft 74 support the reel bats 75. The baffle plate 77 extends forwardly from the rear wall 43 towards the auger 52 so as to give a space behind the auger to accommodate the longitudinal flow of the harvested material without backfeeding over the auger.

At the end 43x of the rear wall 43 Figs. 1 and 3 and behind the fan blades 49 and 51 is an outlet 78 merging into the passage 80 previously mentioned. The floor 44x of the feeding chamber merges into the floor 82 of the passage 80 communicating to the threshing chamber 86. Sidewalls 83 and 84 and roof elements 81 and 81a are shown. Sidewalls 85 and 85x at the outlet 78 and the top element 81x and side flaps 81x" may be employed, if desired.

At 87, Fig. 1, is shown a threshing concave beneath the threshing cylinder 27. It is obvious that means for adjusting the concave or cylinder to increase or decrease the threshing passage may be provided.

Threshing cylinders tend to hook and backfeed crops under a roof such as 81a, and produce congestion at the intake to the threshing chamber. The effect of the air blast produced by the blades 49—51 is to drive the air through the cylinder 79, the straw passing under the cylinder 27 for threshing on the concave 87. Thus the air stream at the rear of the chamber 86 is above the threshed crop ejected from the concave. I arch threshed crop ejected from the concave. I arch or curve the roof line 89 of the passage 88 in rear of the cutoff, as disclosed; thus the air stream strikes the roof 89 substantially at a tangent and depresses the upward flow of the threshed crop ejected from the concave or so that it misses the cutoff 81a, the crop flowing onwardly and upwardly and thence downwardly along the directing roof line 89 and as indicated by the arrows in Fig. 1. Thus the crop flows over the spiral conveyor 90 in the separator section. If desired I may employ a door 89' for service purposes and for admitting auxiliary air into the separator passage. The separating, auxiliary threshing and suction cleaning mechanisms are arranged in rear of the threshing chamber 86 and may be carried by rearward extensions of the beams 22, 23, 24 to counterbalance the platform, if desired. One of the advantages of my device is in utilizing the effect of the centrifugal force of the cylinder in causing immediate separation of a large percentage of the grain from the straw through an open grate or sieve 98 placed directly in rear of the threshing chamber, the grain being caught in a grain hopper 100 for transport to a bin or other receptacle, and during such separation to draw chaff, dust, etc., from the hopper section by means of a suction fan 97.

The spiral conveyor 90, which may be notched as seen in Figs. 1 and 6, at 90a, is secured to the tube 91, Fig. 2 which is provided with end gudgeons 92 and 94 journaled in frame supported bearings such as 95. The tube 91 extends to an exhaust fan chamber 93. Within the casing 93 are arms 96 rigid to the shaft 94, each carrying a blade such as 97 as the exhaust fan assembly. If desired, in lieu of the spiral conveyor 90 I may use rearwardly spiralling arms rigidly attached to the tube 91. The alternate construction seen in Fig. 6 will be later explained. Covering the spiral conveyor 90 between the fan chamber 93 and the terminus 99 of the wall 83 is a curved top element 89a Figs. 1 and 2. A curved rear inspection door 89z may be hinged at 89y to the rear edges of the roof 89 and top element 89a and is normally closed as seen in Fig. 1 against the frame member 89x, Fig. 5 to complete the roof element of the separator passage.

A concave grate or sieve 98 cradled on supports 139, 139x and 139y and the frame line 89x, extends from the wall 84 to the fan chamber 93. The grate 98 serves as a chaffer and perforated pan beneath the spiral conveyor 90 and passes the discharge of grain under the influence of the centrifugal force of the threshing cylinder 27; the threshed grain retained in the straw stream is swirled with the straw towards the fan chamber 93, and the retained grains pass through the grate 98 during such swirling travel. The spiral conveyor 90 does more than simply mechanically convey the threshed straw crop, the spiral serves to define an air passage and the blast of the blades 49—51 and the suction of the fan 97 creates therefore a spiral cyclonic flow of the straw under the added impulse of the spiral mechanically acting, or so that the threshed crop is agitated and swirled through the tubular section below the roof element 89a leading to the fan chamber 93. The spiral conveyor 90 serves to wipe the grate 98 and keep the perforations clean or so that grains will pass through whenever alined with such holes. Arranged beneath the grate 98 intermediate the wall 84 and the fan chamber 93 is shown a grain hopper 100—101—103 which receives the grain and air that has passed through the concave grate 98. One of the main features of the invention is to utilize the suction of the fan 97 for withdrawing the chaff, dust and broken straw that has passed through the grate 98 into the hopper section, and by means of the valve 93y and sliding plate 93x the passage of air from the hopper into the fan chamber 93 may be restricted to prevent grain being drawn from the hopper into the fan chamber 93. This is of particular importance where the lighter grains are being threshed. Some air of course is constantly being drawn upwardly from the hopper through the grate under the suction of the fan 97 and this assists in helping to keep the perforated grate 98 clean for grain passage into the hopper. In Fig. 2 the upper part of the sieve 98 at the left is broken away to show the wall 100 of the hopper, which member with the rear edge of the floor 87x and with the bottom of the member 89a form the lower housing of the separator. A grain auger 102 operates above the grain pan 101 of the hopper for transferring the recovered grains, which have passed the grate 98, away from the fan chamber 93. The grain auger discharges the grains into elevating means later described.

A sprocket, not shown, on cylinder shaft 20 drives the main chain 104 to drive the large sprocket 105 rigid to the jack shaft 106, journaled in bearings 106x. On the shaft 106 are a pair of sprockets. From one leads the drive chain 108 for the harvester mechanisms; from the other sprocket leads the drive chain 109 for the separator mechanisms. The chain 108 drives a duplex sprocket journaled on the shaft 30—30x to drive the chain 111 which drives the sprocket 112, Fig. 3, keyed to the main shaft 45 of the harvester. The chain 109 leads under the drive sprocket 113 rigid to the shaft 92 so as to rotate the spiral conveyor and the fan 97, Fig. 2 in the direction of the arrow, Fig. 1. The chain 109 next leads around the idler 114 and another sprocket 117 and back to the sprocket on shaft 106.

The harvested straw, severed by the sickle, is moved longitudinally on the pan 44 by the spiral conveyor 52 and in the space behind the conveyor confined by the baffle 77. This crop is advanced against the screw 50x of the fan-feeder 51—49 which creates an air suction through the intake opening to the enclosed feeding chamber 97 and the blades 49 and 51 turn and drive the crop in an air blast through the outlet 78 to feed the threshing cylinder 27 evenly across its full width of intake. The importance of this air blast is next considered. It is the usual practice to employ a stripping beater immediately behind and above threshing cylinders to depress and strip threshed elements from the cylinder teeth or bars. The cylinder has just as much tendency to back feed the threshed crop into the feeding chamber as to properly feed crops moving to the threshing chamber from the feeding chamber. The crop obviously passes under the cylinder and above the concave and it is of course desired that the centrifugal force of the cylinder be employed to separate a major part of the threshed grain, as well as to move the crop into the separator without such backfeeding. The air blast as sucked in with the harvested crop at the intake open side of the closed feeding chamber 97 does not pass with the crop under the cylinder, instead it penetrates through the cylinder and arrives above the threshed crop ejected from the concave. It therefore serves to blast away materials that might cling to the cylinder bars and by arching the roof 89 behind the cylinder, or so that the air discharge may strike the roof 89 substantially at a tangent, the air stream tends to depress the harvested-threshed crop and force it to skid along under the upwardly and downwardly controlling path of the arched roof element or so that it reaches the separator section, and conversely does not attempt to backfeed over the cylinder under the cut-off plate 81a. The cylinder throws off the major part of the grain through the grate 98 into the hopper by centrifugal force. Subsequently the spiral conveyor 90 serves to keep the straw swirling in a fog, assisted by the suction of the fan 97. Ordinary racks and raddles used in separators have no means for re-threshing the threshed straw stream. The conveyor 90, however, does continue the threshing process in combination with the concave grate 98, or so that if the main cylinder 27 should not knock out all grains from the heads, there is still this auxiliary threshing function in the separator section to finish and complete the threshing function. The straw discharged from the influence of the spiral conveyor 90 and the chaff sucked from the hopper enters the fan chamber 93 and may be spread by the blast of the fan 97 over the ground. The outlet pipe 134 may be lengthened and discharge the straw into a trailing wagon or other suitable means, in the event it is desired to save the straw for feed. It is also obvious that a lengthened pipe 134 may be employed, in stationary threshing, to deposit the discharged straw into a straw pile.

In the event more air is required in the hopper section than is normally supplied from the intake into the closed fan feeding chamber 79, such additional air may be directly admitted through auxiliary air inlets, such for instance as the valve 89' and the valves 135 hinged as at 136. Also valves 138 may open or close ports between the hopper and separator tube, if found desirable. The suction through the hopper cleans the grain recovered and transported by the auger 102. It is obvious that a recleaner may be employed, if so desired. The chain 116 and the lever 138a may be used to open and close the auxiliary valves. The grate supports 139, 139x and 139y may serve as baffles, if so desired.

One means for delivering grains from the auger 102 to the grain bin 124 may be the elevator 120, Fig. 2. A bucket chain, not shown, but driven from the auger shaft 121 to lead around the head shaft 122 of the elevator dumps the grain through the spout 123 into the bin 124. The bin is supported by posts 125 and 15. The jack shaft 118 and the sprocket 117 driven by the chain 109 also has another sprocket 117x, keyed thereto, and from which leads a chain to drive a sprocket keyed on the shaft 121. In the event the separator is pivotally supported by the rearward extensions of the beams 22, 23x and 24 instead of being built rigidly into the frame supports 17, it would be necessary to pivot the elevator 120 around the shaft 121 so as to permit the spout 123 to move back and forth along the upper side edge of the grain bin 124. In this case I employ a roller 127 journaled upon a stub shaft 127x which is rigidly affixed to the side of the elevator 120. This roller 127 may thus move forwardly or backwardly upon the inclined track 128 affixed to the side of the bin 124 as in Fig. 2.

Referring to Figs. 6 and 7 will be seen another means of transferring the grain from the auger 102 to the bin 124. Fig. 6 also shows an alternate construction of the spiral conveyor-fan assembly used in the separator. The fan 97 rotates at a speed found necessary for grain cleaning and straw ejection, it is not necessary that the spiral conveyor 90 travel at this high velocity. In fact it may be better to retard the velocity of the straw stream passing through the separator, hence I show in Fig. 6 how this may be accomplished and still eliminate congestion in the separator. Just as the harvester conveyor 52 rotates slower than the fan-feeder 49—51 I can float the spiral conveyor 90z in the separator on the high speed fan shaft 144; at 140 is a housing for the bearing 141 supported by a frame member. The tube 91z carrying the spiral conveyor 90z has a driving sprocket 142 driven from a jack shaft associated with the chain drive 109. The tube 91z rotates on the bearing 141 as illustrated. Within the tube 91z is seen the high speed fan shaft 144, journaled on the bearing 143 within the tube. The bearing 95x supported on a frame member receives the other end of the fan shaft 144. At 145 is seen a bearing sleeved on the shaft 144 upon which the other end of the tube 91z rotates. The fan 97 keyed to shaft 144 operates within the fan chamber 93 as previously described. The auger 90z rotates slower than the fan 97 and holds the straw within the separator passage the maximum duration of time without clogging the harvester or thresher. Upon the high speed shaft 144, driven by the sprocket 113x from the chain 109 may be carried another fan 146, arranged within a fan chamber 147. Without the fan chamber is seen the sprocket 148 from which leads a chain to drive the sprocket, such as 117z, to drive the auger shaft 121. The fan rotates in the direction of the arrow, Fig. 7 and air is discharged through the pipe 149 to blow the grain, expelled through the tube 150 by the auger 102, forwardly through the grain outlet pipe 149x, which connects to the standpipe 152 curved at 153 to discharge the grain into the bin 124, to a recleaner, not shown, or elsewhere as may be desired. The flexible tube 151 allows for movement of the separator in the event it is not built rigid into the main frame.

When the platform is raised to the position indicated by 28' and associated parts, Fig. 1, the rear wall 103 assumes the angle 103x which is sufficient to drain the grain to the pan 101x. When the platform is lowered the front wall 100x would assume the position 100 which is sufficient to drain the grain to the pan 101. In this case, the concave 87 pivots around the cylinder and maintains threshing adjustments. If desired, the rearward extensions of the beams 22, 23x and 24 could be omitted and the separator be rigidly supported by the studs 15, 17 and 16 and telescopic means introduced between the threshing chamber 86 and the separator tube 89a—98, for passing threshed elements from the thresher to the separator.

The harvester-thresher may be self-propelled, pushed or trailed. The machine is adapted for threshing bundle grains and stacked grain. Forcing the threshed straw to change direction after leaving the passage 88 eliminates the possibility of the cylinder throwing grain out of the rear of the separator. The spiral conveyor 90, as previously mentioned, promotes a supplemental and continued beating and scrubbing of the entire crop during the swirling flow through the separator tube towards the fan chamber 93. This insures both maximum threshing as well as greatly increasing the distance of travel of the threshed crop through the separator over old conventional separating mechanisms. This greatly increased time and length of straw separating flow insures the recovery of the grain and the elimination of volunteer crops produced by lack of rethreshing and complete separation. The platform may be disconnected for road travel purposes.

Such modifications may be employed as lie within the scope of the appended claims. Having fully described my invention, what I now claim as new and desire to secure by Letters Patent is:

1. In a vehicular machine of the class described, a frame, a threshing chamber and a threshing cylinder and shaft operable within said chamber; a fan feeding chamber forward of the threshing chamber and in communication therewith; said fan feeding chamber having a cover, a floor pan and an end closure element allied therewith, said chamber being open at its opposite end as an air and crop inlet; a fan-feeding mechanism operating within said chamber for receiving air and crop materials through said side inlet and for exhausting the same to the threshing chamber; a tubular separator receiving from the threshing chamber and a suction fan chamber and a fan assembly in receptive communication with said separator; a spiral conveying mechanism journaled to operate within the separator for delivering to the suction fan and means for driving said spiral conveyor and fan independently of each other.

2. In a vehicle of the class described, a threshing cylinder on a shaft journaled in bearings supported by frame means carried by the vehicle and including a threshing chamber, a fan feeding mechanism in an enclosed chamber as a blower delivering to the threshing mechanisms, said enclosed chamber being open at one side for admitting air to the fan feeding mechanism and for the reception of crop materials; and a tubular separator in receptive communication with the threshing chamber, a suction fan chamber and fan assembly in receptive communication with the tubular separator, and a spiral conveying mechanism journaled in the separator; and means for driving said spiral conveyor and fan assembly independently of each other; a hopper for the separator and a concave grate intermediate the spiral conveyor and the hopper.

3. In a vehicle of the class described, a blower fan and an exhaust fan in combination; an enclosed chamber open at one side for admitting air and crop materials, said chamber housing the blower fan operable therein and serving as a feeder to a threshing chamber; a threshing cylinder journaled on the vehicle and operable within said threshing chamber; a separator tubular section in receptive communication with the threshing chamber and an exhaust fan chamber housing the exhaust fan and operable therein, said fan chamber being in receptive communication with the separator; a spiral conveyor mechanism within the separator for mechanically transporting elements in an air blast produced by the combined fan combinations; and a grate permitting separation of grains during such travel.

4. In a rotary harvester thresher, a fan assembly in an enclosed fan chamber as a blower, said fan chamber being open along one side to admit air and materials to the blower; a threshing cylinder in a threshing chamber receiving an air blast from the blower, said blower serving as a feeding mechanism to the threshing chamber, a tubular separator receiving air and materials from the blower and threshing chamber, a spiral conveyor journaled in the tubular separator for mechanically conveying materials from the threshing chamber and for agitating the air blast, and a suction fan in an exhaust chamber receiving from the tubular separator and for expelling the air blast of the blower and waste materials from the exhaust chamber.

5. In a rotary thresher, a blower fan in a crop receiving fan chamber and an exhaust fan in a discharge chamber in combination, the blower fan serving as a feeder to a threshing chamber, said threshing chamber including a threshing cylinder and a concave in operative combination therein, a separator intermediate the threshing chamber and the discharge chamber including a tubular passage, a grate in rear of the threshing chamber and extending as a pan portion of the tubular passage, a hopper arranged behind the threshing chamber and coextensive with and below the grate and pan portion, and a spiral conveyor and auxiliary threshing mechanism operatively arranged within the tubular passage; said hopper serving as a receiver for grains separated through the grate under the centrifugal influence of the threshing cylinder and the rotary influence of the spiral conveyor mechanism, and said exhaust fan serving to withdraw air currents passing through the blower fan chamber, the threshing chamber, the tubular passage and the hopper and to expel waste materials with such air flushings from the discharge chamber.

6. In a machine as described in claim 5; and an auger journaled in the hopper for transferring grains to an elevating mechanism beyond the intake end of the separator, said mechanism including another fan chamber and a fan therein, an air inlet to said fan chamber and an air outlet therefrom communicating through the grain discharge outlet of the hopper and for promoting a transfer of grains from the hopper outlet to a desired receptacle.

7. In a rotary thresher, a pivoted frame, a main threshing chamber and a concave, a feeding mechanism delivering to the threshing chamber and an undershot threshing cylinder and shaft operating in said threshing chamber and above said concave, all supported on said pivoted frame; a separator including a conveyor casing and a suction fan chamber into which said conveyor casing discharges at one end, said fan chamber having an exhaust outlet, said conveyor casing at its intake end being open along one side and in receptive communication with the threshing chamber; a spiral conveyor and auxiliary threshing and fan assembly operating in said conveyor casing and fan chamber and in parallelism with the shaft of the threshing cylinder; said separator also including a hopper and a grate in rear of the threshing cylinder arranged above the hopper and extending as a perforated pan section of the conveyor casing; and valve means controlling air flushing currents through the hopper into the fan chamber under the suction of said fan.

8. In a machine of the class described, a threshing chamber including a concave carried on a pivotally supported frame, a threshing cylinder operatively arranged within said chamber, a fan chamber having an air and crop intake supported on said frame forward of and communicating to said threshing chamber and a fan assembly operatively arranged within said fan chamber as a feeding blower delivering to said cylinder; a separator including a casing and a suction fan chamber into which said casing delivers at one end, said fan chamber having an exhaust outlet; said separator at its intake end being open along one side and in receptive communication with the threshing chamber; a spiral conveyor and auxiliary threshing mechanism and fan assembly operating within the separator casing and suction fan chamber and in parallelism with the cylinder shaft; a grate in rear of the threshing chamber and extending as a perforated pan of the conveyor casing under the spiral conveying mechanism; and a hopped arranged beneath the grate and in communication with the suction chamber, and grain conveying means delivering from said hopper.

9. In a machine as described in claim 8; said fan assembly in the suction chamber serving to withdraw air from the hopper, and valve means intermediate the hopper and the suction chamber for regulating such air withdrawal.

10. In a machine as described in claim 5; and means for driving said exhaust fan and spiral conveyor independently of each other.

WILLIAM C. EDWARDS, Jr.